US012037844B2

(12) United States Patent
Menendez

(10) Patent No.: US 12,037,844 B2
(45) Date of Patent: Jul. 16, 2024

(54) ROLLER TUBE TENSION INSERT

(71) Applicant: Crestron Electronics, Inc., Rockleigh, NJ (US)

(72) Inventor: Victor M. Menendez, Carrollton, TX (US)

(73) Assignee: Crestron Electronics, Inc., Rockleigh, NJ (US)

( * ) Notice: Subject to any disclaimer, the term of this patent is extended or adjusted under 35 U.S.C. 154(b) by 147 days.

(21) Appl. No.: 17/307,555

(22) Filed: May 4, 2021

(65) Prior Publication Data

US 2022/0356756 A1 Nov. 10, 2022

(51) Int. Cl.
*E06B 9/44* (2006.01)
*E06B 9/72* (2006.01)

(52) U.S. Cl.
CPC . *E06B 9/44* (2013.01); *E06B 9/72* (2013.01)

(58) Field of Classification Search
CPC ..... E06B 9/44; E06B 9/42; E06B 9/40; E06B 9/50; E06B 9/171
See application file for complete search history.

(56) References Cited

U.S. PATENT DOCUMENTS 4,286,777 A * 9/1981 Brown .................... F16F 3/093 267/141.1
6,378,594 B1 * 4/2002 Yamanaka ............. G03B 21/58 160/238
6,746,373 B1 * 6/2004 Bohmer ................. A63B 21/05 482/44
6,902,141 B2 6/2005 Kirby
7,134,473 B2 11/2006 Lukos
7,584,578 B2 * 9/2009 Hilmy ................... E04H 9/0237 52/167.2
7,823,620 B2 11/2010 Kirby
8,051,993 B1 * 11/2011 Tu ............................ E06B 9/44 211/123
8,276,642 B2 10/2012 Berman et al.
9,593,530 B1 * 3/2017 Anthony ................... E06B 9/90
10,047,537 B2 * 8/2018 Douglas ................ E04H 9/0237
10,309,153 B2 6/2019 McPherson et al.
2002/0024182 A1 * 2/2002 Matrak ................ F16J 15/3452 277/377
2004/0129850 A1 * 7/2004 Kirby ........................ E06B 9/42 248/266

(Continued)

FOREIGN PATENT DOCUMENTS

EP 0494501 7/1992

*Primary Examiner* — Daniel P Cahn
*Assistant Examiner* — Matthew R. Shepherd
(74) *Attorney, Agent, or Firm* — Crestron Electronics, Inc.

(57) ABSTRACT

A roller shade for selectively covering an architectural opening and which reduces deflection and sagging in the roller shade. The roller shade comprises a tension insert inserted and substantially centered within the roller tube of the roller shade. The tension insert comprises a longitudinal insert body, a threaded rod, and a pair of threaded nuts. The insert body comprises an inner tube portion with a plurality of longitudinal fins circumferentially extending from the inner tube portion. The threaded rod is inserted within the inner tube portion of the insert body and the insert body is longitudinally compressed by threading the pair of threaded nuts on the threaded rod.

19 Claims, 7 Drawing Sheets

(56) References Cited

U.S. PATENT DOCUMENTS

| | | | | |
|---|---|---|---|---|
| 2005/0016695 A1* | 1/2005 | Thompson | E06B 9/581 | 160/268.1 |
| 2005/0077017 A1* | 4/2005 | Ramsey | A63J 1/02 | 160/238 |
| 2007/0051478 A1* | 3/2007 | Wieczorek | E06B 9/42 | 160/323.1 |
| 2008/0073039 A1* | 3/2008 | Gyngell | E06B 9/60 | 160/315 |
| 2011/0006179 A1* | 1/2011 | Holland | A47G 29/1216 | 248/218.4 |
| 2015/0191973 A1* | 7/2015 | Bohlen | E06B 9/78 | 160/291 |
| 2016/0326801 A1* | 11/2016 | Blair | E06B 9/50 | |
| 2016/0374497 A1* | 12/2016 | McCarthy | H01M 50/213 | 160/310 |

* cited by examiner

ROLLER TUBE TENSION INSERT

BACKGROUND OF THE INVENTION

Technical Field

Aspects of the embodiments generally relate to roller shades, and more specifically to systems, methods, and modes for a roller tube tension insert for removing sagging in the roller tube.

Background Art

Roller shades are effective in screening windows, doors, or the like, to achieve privacy and thermal effects. A roller shade typically includes a rectangular shade material, such as fabric, attached at its top end to a cylindrical rotating tube, called a roller tube, and at an opposite bottom end to a hem bar. The roller shade is mounted between two mounting brackets and the shade material drops down tangential from the back of the roller tube. The roller tube is rotated either manually or via an electric motor to wrap or unwrap the shade material with respect to the roller tube. The roller tube can be rotated in a first direction to roll down the shade material to cover a window and in a second direction to roll up the shade material to uncover the window.

However, for large spanning windows where long roller tubes are necessary, the roller tubes tend to sag, known as deflection, at the center due to the weight of the tube itself as well as the shade material rolled on as well as hanging off the roller tube, for example as shown in FIG. 7A. When deflection occurs in a shade tube, the shade material will appear to drape or swag towards the center of the material, resulting in an unpleasantly aesthetic roller shade. Roller tube sagging is not only unsightly but introduces operational challenges that can compromise the components as well as the operation or the roller shade. When the roller tube is deflected, impermissible stresses are introduced on the roller tube and/or the roller shade drive mechanism disposed within the roller tube, such as the motor, drive gears, clutches, drive shafts, or the like. In addition, the drape in the shade material will cause the shade material to roll up unevenly and to telescope from the side edges of the roller tube and to bunch up in the center. This leads to crooked, wrinkled, and/or damaged shade and decreases the expected life cycle of the roller shade and shade material.

Some solutions have been implemented to attempt to reduce or eliminate the sagging in the roller tube in large constructed roller shades. This includes increasing the diameter of the roller tube. As a roller shade increases in width, different tube diameters are used to reduce tube sagging or deflection. The combination of the shade's width, height, tube diameter, and the weight of the shade material and hem bar will determine the maximum height and width allowable by the tube diameter used. If the width, height, or weight is succeeded of a particular tube diameter, sagging or deflection in the roller tube occurs. However, roller tubes of very large diameter will be required to accommodate large spanning windows—resulting in a heavy, unsightly, and difficult to install roller shade. In addition, this solution introduces manufacturing implications as variously sized roller tubes and complementing components must be stocked to accommodate differently sized windows.

Other solutions provide for shifting the support position of the roller tube from being at the terminal edge to a distance away from the terminal edge. Such support assembly, however, may interfere with the placement of the drive components of the roller shade that are typically disposed proximate to the ends of the roller rube. In addition, because the support is not provided at the center of the roller tube, the system may still create a deformity in the tube. Another solution uses an inner tube within an outer tube where the inner tube may sag while maintaining the outer tube straight. Yet, such solutions still introduce deformity and stresses to the roller shade construction and interfere with operation and placement of the drive components of the roller shade. Another alternative solution provides a support system that cradles the bottom end of the roller tube to provide support throughout the entire width of the shade. This, however, requires the shade material to come in contact with and rub against the support cradle as the shade material is rolled up and down, which can wear the shade material over time.

Accordingly, a need has arisen for systems, methods, and modes for a roller tube tension insert that removes sagging or deflection in the roller tube by allowing the calculation for deflection to be increased with roller shade spans.

SUMMARY OF THE INVENTION

It is an object of the embodiments to substantially solve at least the problems and/or disadvantages discussed above, and to provide at least one or more of the advantages described below.

It is therefore a general aspect of the embodiments to provide for systems, methods, and modes for a roller tube tension insert that removes sagging in the roller tube by changing the tube defection calculation. Particularly, the tensioned insert of the present embodiments changes how the weight is distributed over the length of the tube. By spreading the center-weight away from the center, the tension insert reduces sagging of the tube.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiment, a roller shade is provided for selectively covering an architectural opening and which reduces deflection in the roller shade. The roller shade comprises a longitudinal roller tube, a shade material attached to the roller tube, and a tension insert inserted within the roller tube, wherein the tension insert comprises a longitudinal insert body that is longitudinally compressed via a tensioning mechanism.

According to an embodiment, the tension insert comprises a longitudinal inner tube portion with a plurality of longitudinal fins circumferentially extending from the inner tube portion. The plurality of longitudinal fins may be equidistant from each other. According to an embodiment, the plurality of longitudinal fins comprise three fins. Each fin may terminate with a longitudinal curved plate comprising an outer surface adapted to abut an inner surface of the roller tube. According to an embodiment, each fin may terminate with a surface area adapted to abut an inner surface of the roller tube. The inner tube portion of the tension insert may be cylindrical in shape.

According to an embodiment, the inner tube portion may comprise a through bore extending therethrough and wherein the tensioning mechanism comprises a rod extending within the through bore and at least one tensioning member that interacts with the rod to compress the insert body. The rod may comprise a threaded rod and wherein the at least one tensioning member comprises a pair of threaded nuts adapted to threadably couple to the threaded rod to longitudinally compress the insert body between the pair of threaded nuts. According to another embodiment, the rod may comprise a threaded rod on one of its ends and a bolt head on its opposite end, and wherein the at least one tensioning member comprise a threaded nut adapted to threadably couple to the threaded rod to longitudinally compress the insert body between the bolt head and the threaded nut.

According to an embodiment, the tension insert may be substantially centered with respect to the roller tube. The insert body may comprise a length selected from a range of about 50% of a length of the roller tube to about 75% of the length of the roller tube. According to an embodiment, the insert body is compressed to a position where the roller tube is substantially straight. According to an embodiment, the insert body is compressed to a position where the deflection in the roller tube is substantially removed. According to a further embodiment, the insert body is compressed to a position prior to when the insert body begins to bow in an opposite direction from the deflection in the roller tube. According to an embodiment, the position is determined using at least one selected from the group consisting of a size of the roller tube, a weight of the roller tube, a size of the shade material, a weight of the shade material, a size of a hem bar, a weight of a hem bar, and any combination thereof.

According to another aspect of the embodiments, a roller shade is provided for selectively covering an architectural opening and which reduces deflection in the roller shade. The roller shade comprises a longitudinal roller tube, a shade material attached to the roller tube, and a tension insert inserted and substantially centered within the roller tube, wherein the tension insert comprises a longitudinal insert body, a threaded rod, and a pair of threaded nuts, wherein the insert body comprises an inner tube portion with a plurality of longitudinal fins circumferentially extending from the inner tube portion; wherein the threaded rod is inserted within the inner tube portion of the insert body and wherein the insert body is longitudinally compressed by threading the pair of threaded nuts on the threaded rod.

According to yet another aspect of the embodiments, a method is provided for reducing deflection in a roller shade that selectively covers an architectural opening. The method comprises the steps of: inserting a tension insert within a longitudinal roller tube of the roller shade, wherein the roller shade further comprises a shade material attached to the roller tube; and longitudinally compressing the tension insert via a tensioning mechanism. The tension insert may comprise a longitudinal inner tube portion with a plurality of longitudinal fins circumferentially extending from the inner tube portion. Each fin may terminate with a longitudinal curved plate comprising and outer surface adapted to abut an inner surface of the roller tube. The inner tube portion may comprise a through bore extending therethrough and wherein the tensioning mechanism comprises a rod extending within the through bore and at least one tensioning member that interacts with the rod to compress the insert body.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
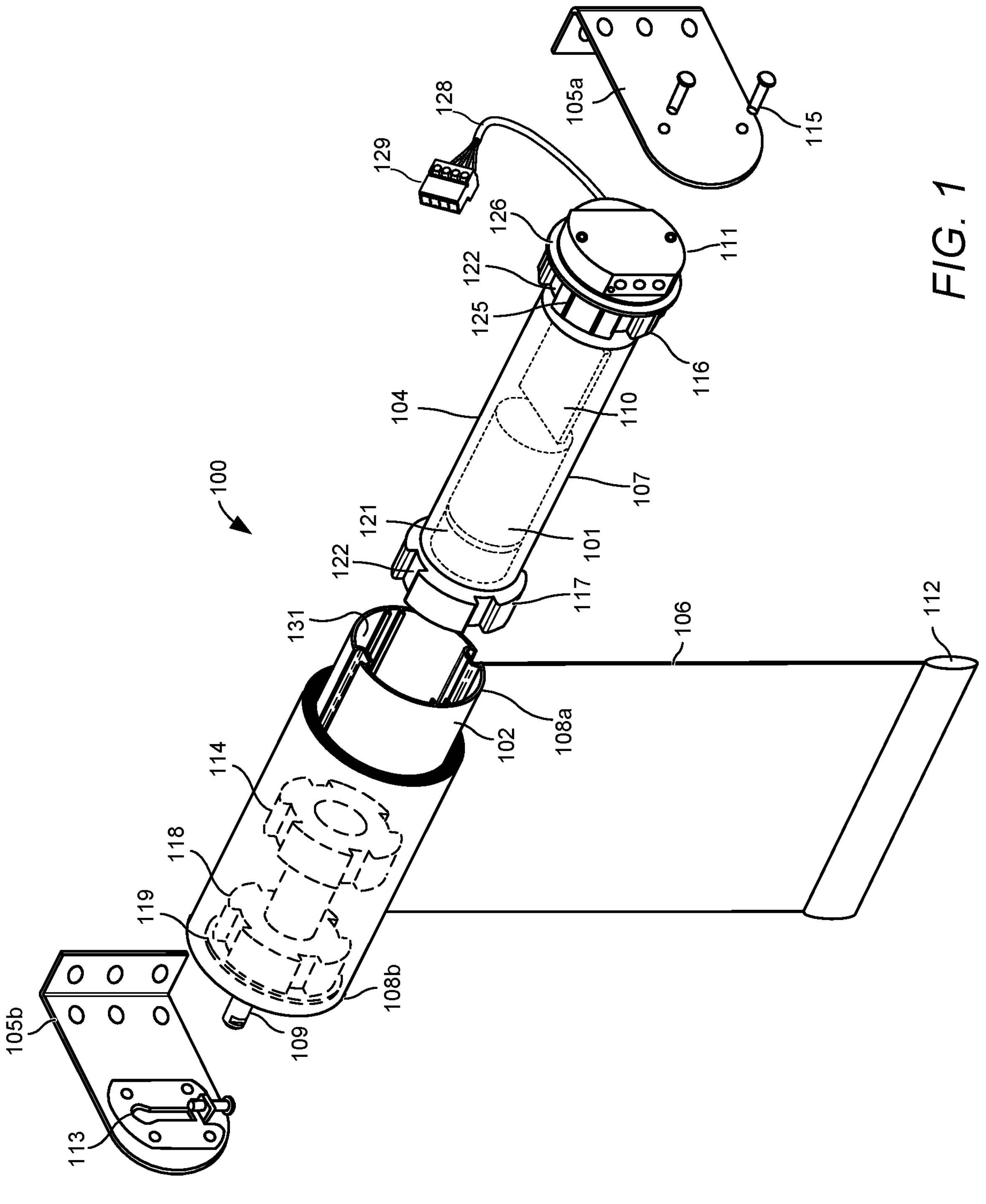

FIG. 1 illustrates a front perspective view of a roller shade according to an illustrative embodiment.

Figure 2:
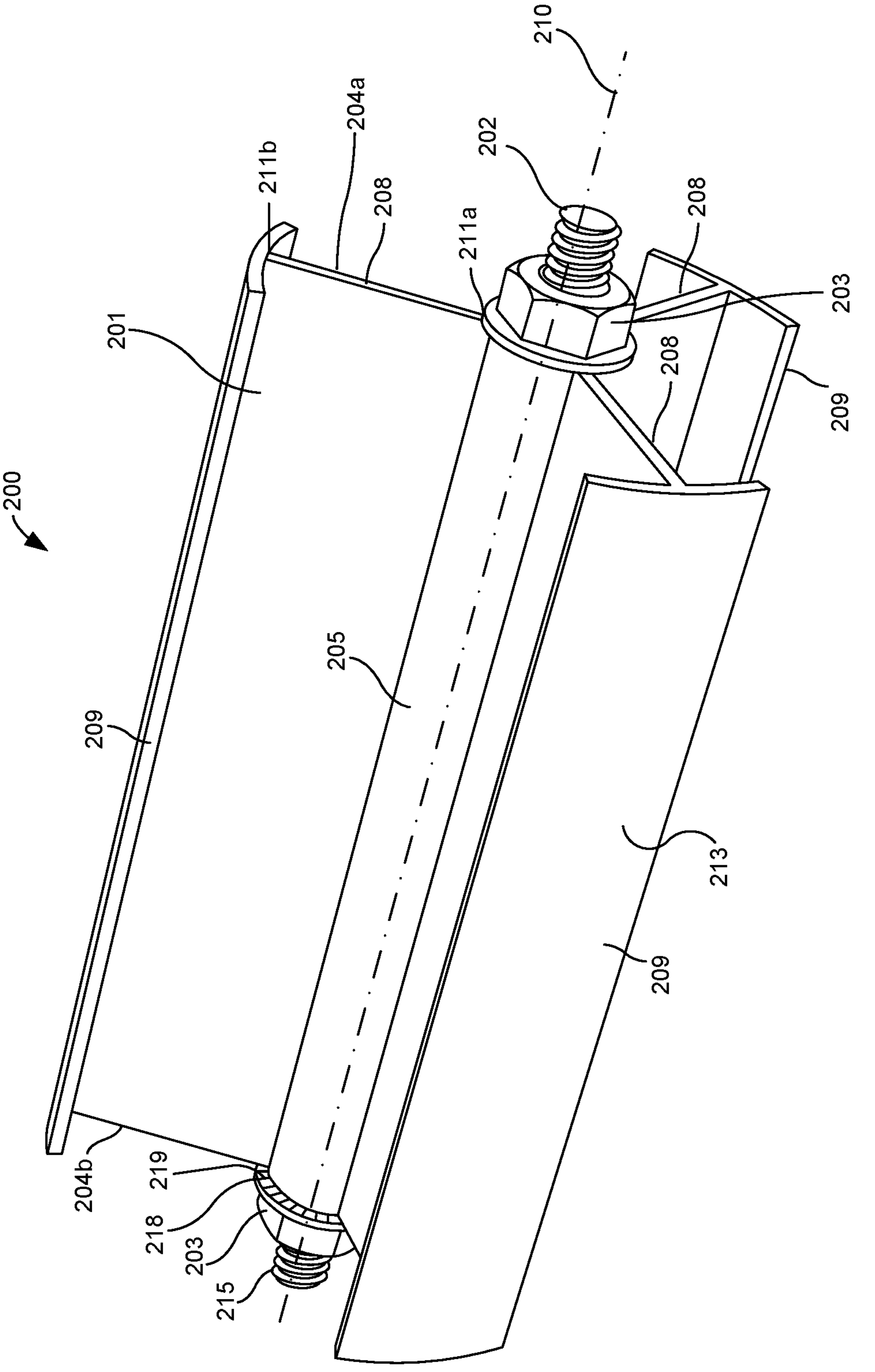

FIG. 2 illustrates a perspective view of a roller tube tension insert according to an illustrative embodiment.

Figure 3:
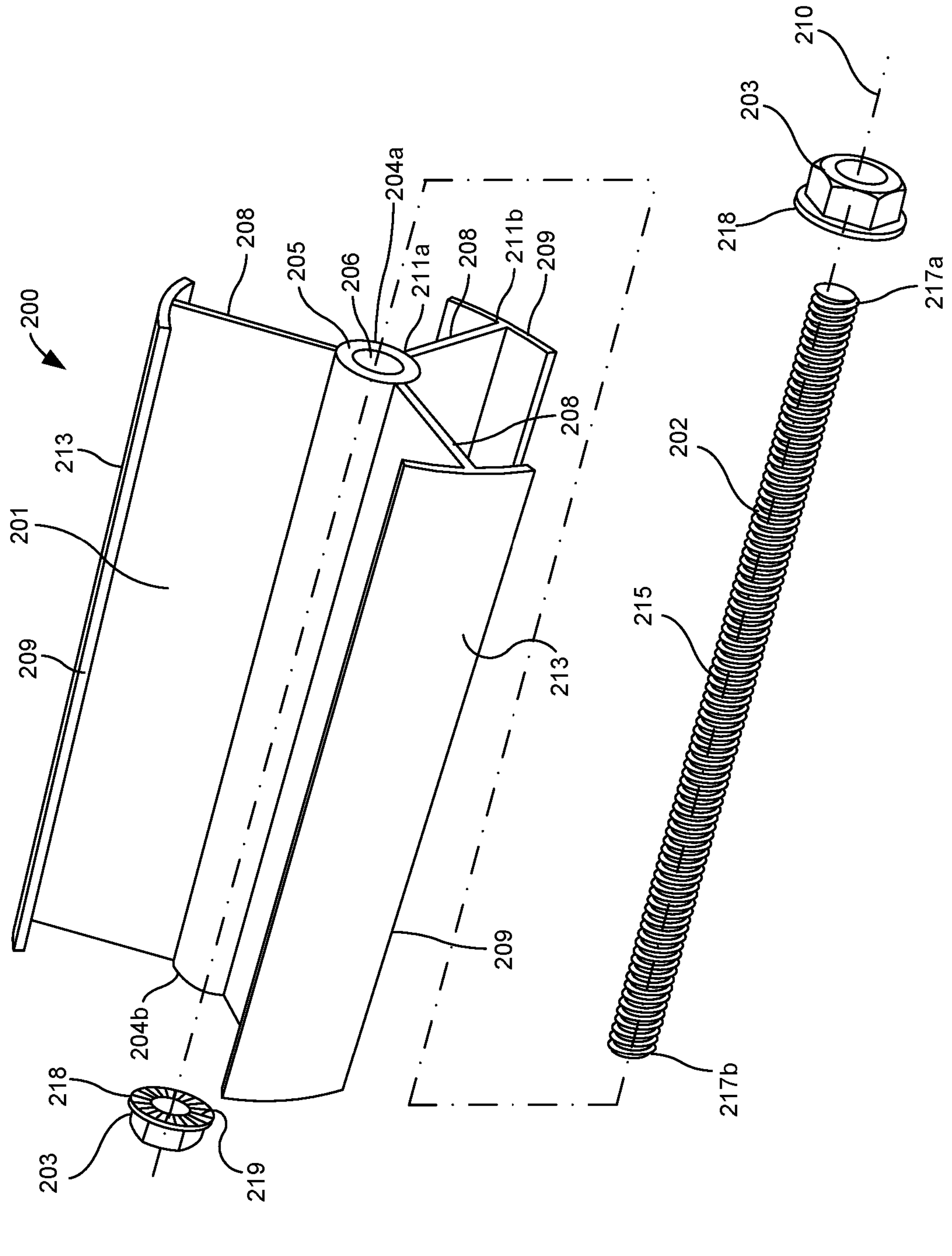

FIG. 3 illustrates an exploded perspective view of the roller tube tension insert according to an illustrative embodiment.

Figure 4:
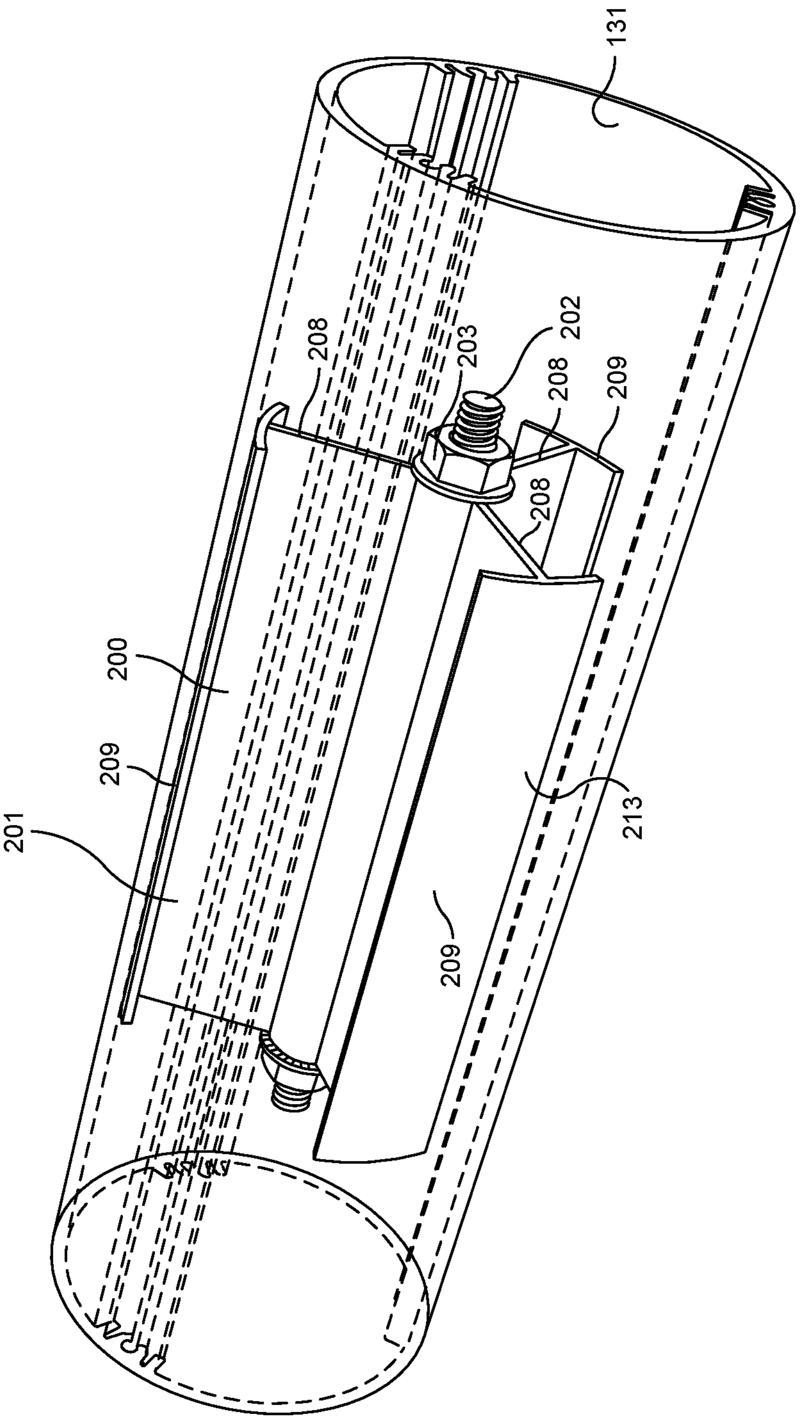

FIG. 4 illustrates a perspective view of the roller tube tension insert inserted within the roller tube according to an illustrative embodiment.

Figure 5:
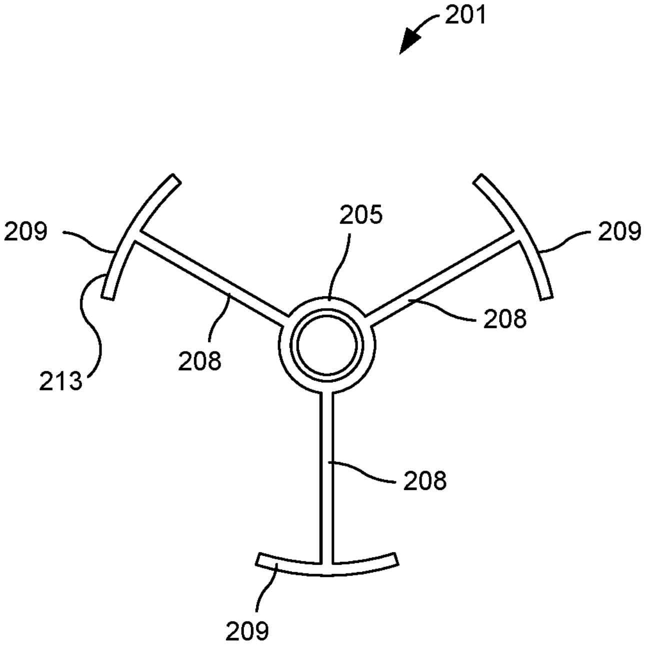

FIG. 5 illustrates a cross sectional view of the roller tube tension insert according to an illustrative embodiment.

Figure 6:
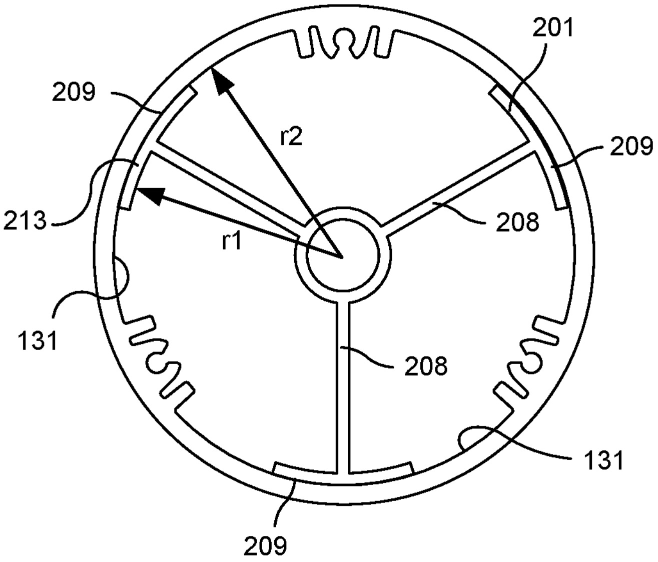

FIG. 6 illustrates a cross sectional view of the roller tube tension insert inserted within the roller tube according to an illustrative embodiment.

Figure 7A:
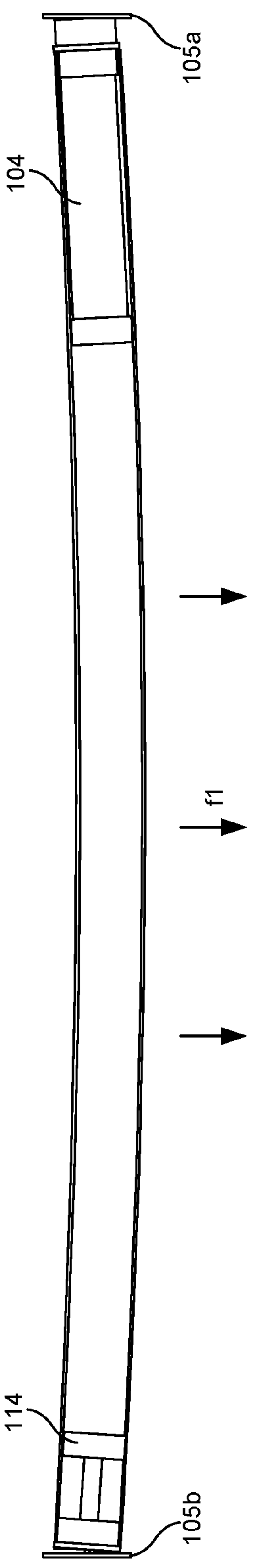

FIG. 7A illustrates a diagram of a front view of the roller shade without the roller tube tension insert according to an illustrative embodiment.

Figure 7B:
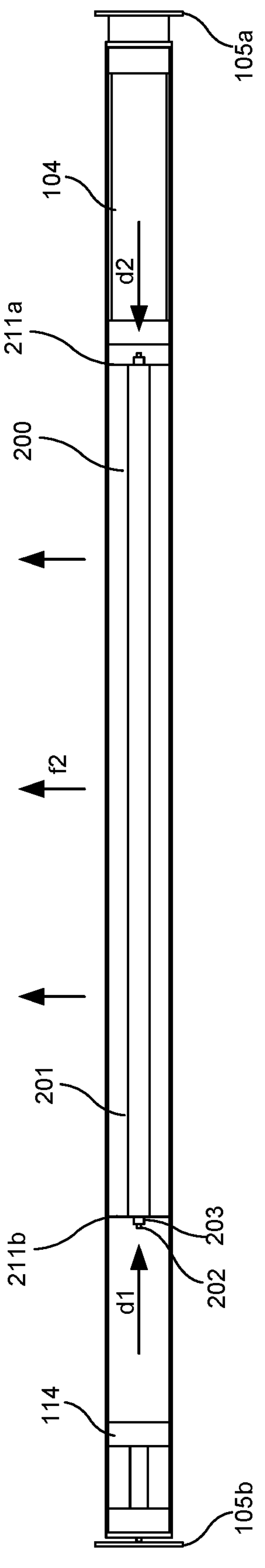

FIG. 7B illustrates a diagram of a front view of the roller shade with the roller tube tension insert inserted within the roller tube according to an illustrative embodiment.

Figure 8:
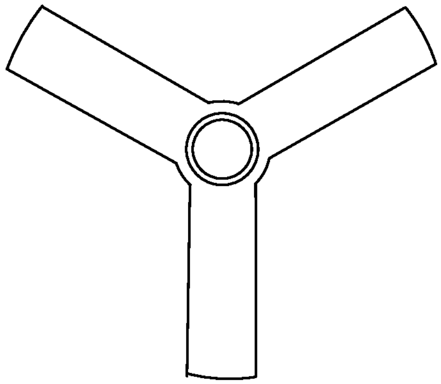

FIG. 8 illustrates a cross sectional view of a roller tube tension insert according to another embodiment.

Figure 9:
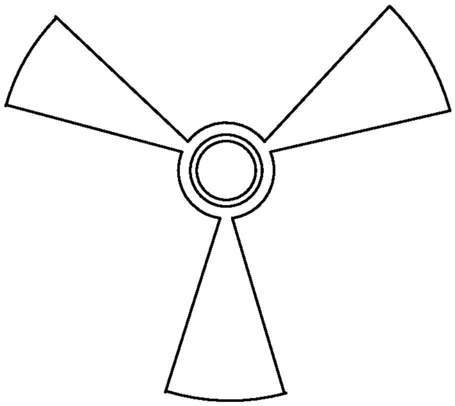

FIG. 9 illustrates a cross sectional view of a roller tube tension insert according to another embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

| | |
|---|---|
| 100 | Roller Shade |
| 101 | Motor |
| 102 | Roller Tube |
| 104 | Shade Drive Unit |
| 105a | First Mounting Bracket |
| 105b | Second Mounting Bracket |
| 106 | Shade Material |
| 107 | Motor Housing |
| 108a | First End |
| 108b | Second End |
| 109 | Idler Pin |
| 110 | Motor Control Module |
| 111 | Motor Head |
| 112 | Hem Bar |
| 113 | Keyhole |
| 114 | Idler Assembly |
| 115 | Screws |
| 116 | Crown Adapter Wheel |
| 117 | Drive Wheel |
| 118 | Idler Body |
| 119 | Flange |
| 121 | Clutch |
| 122 | Channels |
| 125 | Teeth |
| 126 | Flange |
| 128 | Power Cord |
| 129 | Terminal Block |
| 131 | Inner Surface |
| 200 | Roller Tube Tension Insert |
| 201 | Insert Body |
| 202 | Rod |
| 203 | Tensioning Member(s) |
| 204a | First End |
| 204b | Second End |
| 205 | Inner Tube Portion |
| 206 | Through Bore |
| 208 | Longitudinal Fin(s) |
| 209 | Longitudinal Curved Plate(s) |
| 210 | Longitudinal Axis |
| 211a | Proximal End |
| 211b | Distal End |
| 213 | Outer Surface |
| 215 | Threads |
| 217a | First End |
| 217b | Second End |
| 218 | Flange(s) |
| 219 | Locking Grooves |

LIST OF ACRONYMS USED IN THE SPECIFICATION IN ALPHABETICAL ORDER

The following is a list of the acronyms used in the specification in alphabetical order.

| | |
|---|---|
| d | Direction |
| f | Force |
| r | Radius |

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, NJ.

The different aspects of the embodiments described herein pertain to the context of systems, methods, and modes for a roller tube tension insert that removes sagging, also referred to as deflection, in the roller tube. The roller tube described herein may be used for covering any type of architectural opening, such as windows, doors, wall openings, or the like. In addition, while the present embodiments are described in the context of roller shades, the present embodiments may be adopted to be used in other assemblies that utilize large spanning tubes to reduce sagging thereof.

Referring to FIG. 1, there is shown a front perspective view of a roller shade 100 according to one aspect of the embodiments. Roller shade 100 generally comprises a roller tube 102, a shade drive unit 104, an idler assembly 114, shade material 106, and a hem bar 112. Roller tube 102 is generally cylindrical in shape and longitudinally and laterally extends from a first end 108*a* to a second end 108*b*. In various embodiments, the roller tube 102 may comprise aluminum, stainless steel, or the like. Shade material 106 is connected at its top end to the roller tube 102 and at its bottom end to the hem bar 112. In various embodiments, the shade material 106 comprises fabric, plastic, vinyl, or other materials known to those skilled in the art. Hem bar 112 can comprise a weighted bar that runs longitudinally and laterally across the width of the shade material 106 to minimize any movement in the field and properly tension the shade material 106 such that it hands straight. Shade material 106 wraps around the roller tube 102 and is unraveled from the roller tube 102 to cover a window, a door, a wall opening, or the like.

The idler assembly 114 of the roller shade 100 may comprise an idler pin 109 and an idler body 118 rotatably connected about the idler pin 109. The idler body 118 may be inserted through the second end 108*b* into the roller tube 102 and operably connected to the roller tube 102 such that rotation of the roller tube 102 also rotates the idler body 118. The idler body 118 may comprise a flange 119 to prevent the idler body 118 from sliding entirely into the roller tube 102. The idler body 118 may comprise ball bearings therein (not shown) allowing the idler body 118, and thereby the roller tube 102, to rotate with respect to the idler pin 109.

The shade drive unit 104 is adapted raise or lower the shade material 106 to open or close the structural opening, such as a window frame. The shade drive unit 104 may be received within the roller tube 102 and may be adapted to rotate the roller tube 102 to raise or lower the shade material 106. According to one embodiment, the shade drive unit 104 may comprise a mechanical drive assembly for manual or semi-manual operation of the shade 100, for example, allowing adjusting of the shade 100 by pulling or tugging on the hem bar 112 or by pulling on a chain. According to another embodiment, the shade drive unit 104 may comprise a motor for motorized operation of the shade.

In a motorized implementation of the roller shade 100, the shade drive unit 104 may include a motor head 111, a crown adapter wheel 116, a motor housing 107 containing a motor control module 110 and a motor 101 therein, and a drive wheel 117. The shade drive unit 104 may be inserted into first end 108*a* of the roller tube 102. The crown adapter wheel 116 and the drive wheel 117 are generally cylindrical in shape and are inserted into and operably connected to roller tube 102 through its first end 108*a*. Crown adapter wheel 116 and drive wheel 117 may comprise a plurality of channels 122 extending circumferentially about their external surfaces that mate with complementary projections radially extending from the inner surface of the roller tube 102 to lock their respective rotation. Crown adapter wheel 116 can further comprise a plurality of teeth 125 extending circumferentially about its external surface to form a friction fit between the crown adapter wheel 116 and the inner surface of the roller tube 102. The crown adapter wheel 116 may be rotatably attached to a first end of the motor housing 107 via a ball bearing therein (not shown). Crown adapter wheel 116 can further comprise a flange 126 radially extending therefrom to prevent it from sliding entirely into the roller tube 102 and such that the motor head 111 remains at least partially exterior to the roller tube 102. The drive wheel 117 is operably connected, either directly or indirectly, such as through a clutch 121 and/or one or more states of gears, such as planetary gears, to the drive shaft (not shown) of the motor 101 to rotate the roller tube 102. The motor control module 110 may comprise fully integrated electronics to control the motor 101, directing the operation of the motor 101, including its direction, speed, and position. The shade drive unit 104 can be connected to a power source to power the electrical components of the shade drive unit 104 via power cord 128 and terminal block 129.

During installation, the roller shade 100 is mounted on or in a window between the first and second mounting brackets 105*a* and 105*b*. The roller shade 100 may first be mounted to the second mounting bracket 105*b* by inserting the tip of the idler pin 109 into a keyhole 113 of the second mounting bracket 105*b*. The roller shade 100 may then be mounted to the first mounting bracket 105*a* by snapping the motor head 111 of the shade drive unit 104 to the first mounting bracket 105*a* or coupling the motor head 111 to the first mounting bracket 105*a* using screws 115. The mounting brackets 105*a* and 105*b* can comprise similar configuration to the CSS-DECOR3 QMT®3 Series Decŏr Shade Hardware, available from Crestron Electronics, Inc. of Rockleigh, NJ Other types of brackets may be utilized without departing from the scope of the present embodiments.

In operation, the shade material 106 is rolled down and rolled up between an upper limit and a lower limit via the shade drive unit 104. Particularly, the motor 101 drives the drive wheel 117, which in turn engages and rotates the roller tube 102. The roller tube 102, in turn, engages and rotates the crown adapter wheel 116 with respect to the motor 101, while the motor housing 107, including the motor 101 and motor control module 110, remain stationary. As a result, the shade material 106 may be lowered from an upper limit where it is at an opened or rolled up position and substantially fully wrapped about the roller tube 102, to a lower limit where it is at a closed or rolled down position and substantially unraveled from the roller tube 102, and vice versa. Although certain constructions for manual and motorized shade drive units are discussed herein, the present embodiments can be readily adapted to roller shades of various drive configurations as is known in the art.

The roller shade 100 of the present embodiments may come in various sizes to accommodate variously sized windows or architectural openings. To accommodate variously sized windows, the roller tube 102 may be cut to an appropriate length based on customer specifications. In another embodiment, the roller tube 102 may be stocked at various precut lengths and an appropriately sized roller tube 102 may be chosen during assembly of the roller shade 100. As illustrated in FIG. 7A, for large spanning windows where wide roller tubes are necessary, the roller tubes tend to sag and deflect in the center due to the weight of the tube itself as well as the shade material rolled on, as well as hanging off, the roller tube. Thus, according to the present embodiment, to accommodate large sized windows, the present embodiments provide systems, methods, and modes for a roller tube tension insert for removing sagging or deflection in the roller tube by changing the tube deflection calculation. Particularly, the tensioned insert of the present embodiments changes how the weight is distributed over the length of the tube. By spreading the center-weight away from the center, the tension insert reduces sagging and deflection of the tube as further discussed below.

Referring to FIGS. 2, 3, and 5, FIG. 2 illustrates a perspective view, FIG. 3 illustrates an exploded perspective view, and FIG. 5 illustrates a cross sectional view of the roller tube tension insert 200 according to illustrative embodiments. The roller tube tension insert 200 comprises an insert body 201 and a tensioning mechanism, such as a threaded rod 202 and at least one tensioning member 203. According to an embodiment, the insert body 201 can comprise an aluminum material. However, other materials and thickness can be used without departing from the scope of the present embodiments, such as other metals, fiber glass, plastic, or other materials known in the art. Insert body 201 longitudinally extends from a first end 204*a* to a second end 204*b* along longitudinal axis 210. Insert body 201 can comprise a longitudinal inner tube portion 205 which may be cylindrical in shape with a through bore 206 extending therethrough. A plurality of longitudinal fins 208 may circumferentially extend from the inner tube portion 205—from proximal ends 211*a* connected to the inner tube portion 205 to distal ends 211*b*. According to one embodiment, insert body 201 may comprise three fins 208—using three fins 208 provides optimal stability and substantially equal dispersion of tension by the insert body 201 within the roller 201, as is further discussed below. Although according to alternate embodiments, insert body 201 may comprise other number of fins, such as two fins, four fins, or more fins. According to an embodiment, the inner tube portion 205 and/or fins 208 can comprise 1.5 mm thickness, although other thickness may be utilized without departing from the scope of the present embodiments. Each fin 208 may contain a longitudinal curved plate 209 attached at its distal end 211*b*. Although the present embodiments may be implemented without using the longitudinal curved plates 209. For example, instead each fin 208 may comprise a wider surface area at its distal end 211*b*, such as for example shown in FIGS. 8 and 9. The insert body 201 is shaped and sized such that is can snugly slide into and fit within the roller tube 102 as shown in FIGS. 4 and 6. As shown in FIG.

6, the radius r1 of each curved plate 209 can be slightly smaller than the radium r2 of the roller tube 102 such that the outer surface 213 of each curved plate 209 abuts the inner surface 131 of the roller tube 102.

The rod 202 may comprise a metal solid rod longitudinally extending from a first end 217*a* to a second end 217*b* with a length longer than the length of the insert body 201. Although other materials may be utilized for the rod 202. Rod 202 may comprise threads 215. According to one embodiment, rod 202 may be substantially fully threaded such that threads 215 extend substantially fully along the rod 202 from the first end 217*a* to the second end 217*b*. According to another embodiment, rod 202 may comprise threads 215 disposed only proximate to its two opposite ends 217*a* and 217*b* without any threads proximate to the center of the rod 202. The at least one tensioning member 203 may comprise a pair of threaded nuts 203 adapted to threadably mate with threads 215 on the rod 202 on each of its ends 217*a-b*. Threaded nuts 203 may comprise integrated flanges 218 with locking grooves 219. For example, nuts 203 may comprise hexagonal flange locknuts known in the art. According to another embodiment, tensioning members 203 may comprise any combination of a nut or a locking nut with a washer or a locking washer, as is known in the art. According to yet another embodiment, rod 202 may comprise a bolt with threaded rod and a bolt head disposed on its first or second ends 217*a* or 217*b*; a single tensioning member 203 may be threadably secured to the threaded rod opposite to the bolt head. Other tensioning assemblies known in the art may also be used with the present embodiments. Nuts 203 and/or flanges 218 may comprise a diameter that is larger than the bore 206 in the inner tube portion of the tube body 201 such that nuts 203 abut the first and second ends 204*a* and 204*b* and prevented from sliding into the inner tube portion.

During the roller shade assembly, the roller tube 102 can be cut to a length that corresponds to the width of the measured window, or as discussed above a roller tube 102 of appropriate length can be chosen from a stock of precut roller tubes 102 of various sizes. The length of the insert body 201 can be determined using various factors, including but not limited to the weight and/or size of the roller tube 102 (such as its length, diameter, and thickness), the weight and/or size of the shade material 106 (such as its length and width), and the weight and/or size of the hem bar 112. For example, the insert body 201 can be cut to a proportional length that takes up a portion of the length of the roller tube 102, such as about 70% of the length of the roller tube 102. The proportional length of the insert body 201 can range from about 50% of the length of the roller tube 102 to about 75% of the length of the roller tube 102. The proportional length of the insert body 201 in relation to the roller tube 102 can increase as the length of the roller tube 102 increases. For example, roller tubes 102 with shorter lengths that do not tend to significantly sag, may only require an insert body 201 with a shorter proportional length to reduce or remove the sag—such as about 50% of the length of the roller tube 102. On the other hand, large shades with more significant sagging in the roller tube 102 may require an insert body 201 with a larger proportional length to reduce or remove the sag—such as about 75% of the length of the roller tube 102. After determining the appropriate proportional length for the insert body 201, it can be cut to the appropriate size or an insert body 201 of appropriate length can be chosen from a plurality of precut insert bodies 201 of various sizes.

The insert body 201 is then inserted into and substantially centered within the roller tube 102. According to an embodiment, the insert body 201 may be inserted with the rod 202 already located within the bore 206 of the inner tube portion 205. Alternatively, after inserting the insert body 201 into the roller tube 102, rod 202 may be inserted through the bore 206 into the inner tube portion 205. The at least one tensioning member 203 is then used to compress the insert body 201 at both of its ends 204*a* and 204*b*. For example, in a threaded rod 202 and pair of locking nuts 203 implementation shown in FIG. 4, the locking nuts 203 may be threaded onto the threaded rod 202 until coming into contact with the ends 211*a-b* of the insert body 201. Locking nuts 203 can then be further tightened on the threaded rod towards each other to compress the insert body 201 on its two opposite ends 211*a* and 211*b*. For example, a locking wrench can be inserted on one side to hold one of the locking nuts 203 in place while a torque wrench can be inserted on the other side to rotate the other locking nut 203 to compress the insert body 201.

Referring to FIG. 7A, there is shown the roller shade 100 mounted between mounting brackets 105*a-b* before implementing the roller tube tension insert 200 therein. As shown in FIG. 7A, the load created on the roller tube 102 in the center due to the weight and the length of the roller tube 102 and the lack of center support, together with the weight of the shade material 106 and the hem bar 112 (not shown), exert force f1 on the center of the roller tube 102 causing it to sag or bend. Referring to FIG. 7B, when the insert body 201 of the roller tube tension insert 200 is inserted into roller tube 102 and compressed in directions d1 and d2, the sides 211*a-b* of the insert body 201 compress inwardly causing tension to be exerted towards the center of the tension insert 200. This tension is translated from the tube body 201 of the tension insert 200 to the roller tube 102 via the longitudinal fins 208 and curved plates 209 that contact the inner surface 131 of the roller tube 102. The translated tension on the roller tube 102 exerts force f2 that disperses the load from the roller tube 102 and forces the roller tube 102 to deflect or lift upward in opposite direction from force f1 exerted by the load as shown in FIG. 7B. The insert body 201 is compressed until the tension starts to transfer away from the center and prior to reverse deflection of the insert body 201—i.e., prior to when the insert body 201 begins to bend in an opposite direction and thus instead of sagging or deflecting downwards begins to bow or reversely deflect upwards. According to one embodiment, the point of reverse deflection can be determined using a mathematical equation, for example, considering the size and weight of the roller tube 102 and shade material 106. According to various embodiments the mathematical equation can provide a predetermined number of turns of tension, a predetermined measurement of pressure (e.g., in pounds per inch), or the like. According to another embodiment, the roller tube 102 with or without the shade material 106 may be mounted at the factory on a level gantry and the insert body 102 may be tensioned until the sag or downward deflection in the roller tube 102 is substantially removed and before reverse deflection in the roller tube 102 occurs.

As is apparent, the tension insert 200 of the present embodiments can be easily implemented and assembled while effectively removing the sag or deflection in the roller tube 102. The tension insert 200 also provides support in the middle or center of the roller tube 102 where the most significant sagging occurs and most support is needed. This also allows manufacturing to expand the width of a roller shade 100 without increasing the diameter of the roller tube 102. As discussed above, the combination of the width, height, and weight of the shade material and hem bar is used in a calculation to determine the maximum height and width allowable by a tube diameter used. If the roller shade width and height and/or weight is succeeded of a particular tube diameter, downward deflection in the roller tube occurs. The tensioned insert of the present embodiments changes how the weight is distributed over the length of the roller tube. By spreading the center-weight away from the center, the tension insert reduces sagging in the roller tube. As such, the tensioned insert allows the calculation for deflection to be increased with roller shade spans. This simplifies the manufacturing process and resources as a factory can utilize roller tubes 102 of the same size in diameter and configuration for small, middle, or large sized windows without the need to implement a plurality sized roller tube diameters as well as variously sized drive components necessary to mate with and drive the variously sized roller tubes. The center location of the tension insert 200 with respect to the roller tube 102 is also significant as the center space of the roller tube 100 is often not utilized in typical roller shade assemblies. As such, the tension insert 200 of the present embodiments does not interfere with the shade drive unit 104 on one end of the roller tube 102 or the idler assembly 114 on the other end, as shown in FIG. 7B. Moreover, tensioning of the tension insert 200 can be done at the factory to optimal levels, without needing any tensioning by the installer at the field, which simplifies the installation process and eliminates installation errors.

INDUSTRIAL APPLICABILITY

The disclosed embodiments provide systems, methods, and modes for a roller tube tension insert for removing sagging or deflection in the roller tube. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A roller shade for selectively covering an architectural opening and which reduces deflection in the roller shade comprising:
- a roller tube comprising a one-piece fully circular longitudinal body having a tubular inner surface;
- a shade material attached to the roller tube; and
- a tension insert assembly entirely located within the roller tube body, wherein the tension insert assembly comprises:
  - a longitudinal insert body having a longitudinal inner tube with a bore extending therethrough and a plurality of longitudinal fins each circumferentially extending from the inner tube to a terminal end comprising an outer surface;
  - a rod longitudinally extending through the bore of the inner tube; and
  - at least one tensioning member that abuts the insert body and interacts with the rod to longitudinally compress the longitudinal insert body within the roller tube body such that tension is translated outwardly from the longitudinal insert body to the roller tube by forcing the outer surface of each fin to abut against the tubular inner surface of the roller tube and thereby reduce deflection in the roller tube.

2. The roller shade of claim 1, wherein the plurality of longitudinal fins are equidistant from each other.

3. The roller shade of claim 1, wherein the plurality of longitudinal fins comprise three fins.

4. The roller shade of claim 1, wherein each fin terminates with a longitudinal curved plate comprising an outer surface adapted to abut the tubular inner surface of the roller tube.

5. The roller shade of claim 1, wherein each fin terminates with a curved surface area adapted to abut the tubular inner surface of the roller tube.

6. The roller shade of claim 1, wherein the inner tube is cylindrical in shape.

7. The roller shade of claim 1, wherein the rod comprises a threaded rod and wherein the at least one tensioning member comprises a pair of threaded nuts adapted to threadably couple to the threaded rod to longitudinally compress the insert body between the pair of threaded nuts.

8. The roller shade of claim 1, wherein the rod comprises a threaded rod and wherein the at least one tensioning member comprises at least one threaded nut adapted to threadably couple to the threaded rod to longitudinally compress the insert body.

9. The roller shade of claim 8, wherein each fin terminates with a longitudinal curved plate comprising an outer surface adapted to abut the inner surface of the roller tube.

10. The roller shade of claim 1, wherein the tension insert is substantially centered with respect to the roller tube.

11. The roller shade of claim 1, wherein the insert body comprises a length selected from a range of about 50% of a length of the roller tube to about 75% of the length of the roller tube.

12. The roller shade of claim 1, wherein the insert body is compressed to a position where the roller tube is substantially straight.

13. The roller shade of claim 1, wherein the insert body is compressed to a position where the deflection in the roller tube is substantially removed.

14. The roller shade of claim 1, wherein the insert body is compressed to a position prior to when the insert body begins to bow in an opposite direction from the deflection in the roller tube.

15. The roller shade of claim 14, wherein the position is determined using at least one selected from the group consisting of a size of the roller tube, a weight of the roller tube, a size of the shade material, a weight of the shade material, a size of a hem bar, a weight of a hem bar, and any combination thereof.

16. A roller shade for selectively covering an architectural opening and which reduces deflection in the roller shade comprising:

a roller tube comprising a one-piece fully circular longitudinal body having a peripheral wall with a tubular inner surface;

a shade material attached to the roller tube; and a tension insert assembly entirely located within the roller tube body, wherein the tension insert assembly comprises:

a longitudinal insert body having a longitudinal inner tube with a bore extending therethrough and a plurality of longitudinal fins each circumferentially extending from the inner tube to a terminal end comprising an arced outer surface sized and shaped complementary to the inner surface of the peripheral wall of the roller tube such that when the longitudinal insert body is inserted in the roller tube the arced outer surface contacts the inner surface of the peripheral wall of the roller tube;

a rod longitudinally extending through the bore of the inner tube; and at least one tensioning member that interacts with the rod to longitudinally compress the longitudinal insert body within the roller tube body such that tension is translated outwardly from the longitudinal insert body to the roller tube by forcing the outer surface of each fin to abut against the tubular inner surface of the roller tube through an entire length of the outer surface of each fin and thereby reduce deflection in the roller tube.

17. A method for reducing deflection in a roller tube of a roller shade that selectively covers an architectural opening, wherein the roller shade further comprises a shade material attached to the roller tube, wherein the roller tube comprises a one-piece fully circular longitudinal body having a tubular inner surface, the method comprising the steps of:

inserting a tension insert assembly within the longitudinal roller tube body such that the tension insert assembly is entirely located within the roller tube body, wherein the tension insert assembly comprises:

a longitudinal insert body having a longitudinal inner tube with a bore extending therethrough and a plurality of longitudinal fins each circumferentially extending from the inner tube to a terminal end comprising an outer surface;

a rod longitudinally extending through the bore of the inner tube; and at least one tensioning member that abuts the insert body and interacts with the rod; and longitudinally compressing the longitudinal insert body within the roller tube body via the tensioning member such that tension is translated outwardly from the longitudinal insert body to the roller tube by forcing the outer surface of each fin to abut against the tubular inner surface of the roller tube and thereby reduce deflection in the roller tube.

18. The method of claim 17, wherein each fin terminates with a longitudinal curved plate comprising and outer surface adapted to abut the tubular inner surface of the roller tube.

19. The method of claim 17, wherein the rod comprises a threaded rod and wherein the at least one tensioning member comprises at least one threaded nut adapted to threadably couple to the threaded rod to longitudinally compress the insert body.

* * * * *